United States Patent [19]

Leichnitz

[11] Patent Number: 4,684,380

[45] Date of Patent: Aug. 4, 1987

[54] COLORIMETRIC INDICATOR FOR THE INDICATION OF THE EXHAUSTION OF GAS FILTERS

[75] Inventor: Kurt Leichnitz, Gross Grönau, Fed. Rep. of Germany

[73] Assignee: Drägerwerk AG, Fed. Rep. of Germany

[21] Appl. No.: 809,011

[22] Filed: Dec. 13, 1985

[30] Foreign Application Priority Data

Dec. 14, 1984 [DE] Fed. Rep. of Germany ....... 3445639

[51] Int. Cl.[4] .............................................. B01D 53/04

[52] U.S. Cl. ....................................... 55/274; 55/387; 422/119

[58] Field of Search ......................... 55/274, 275, 387; 422/55-60, 86, 87, 119

[56] References Cited

U.S. PATENT DOCUMENTS

| | | | |
|---|---|---|---|
| 595,876 | 12/1897 | Gay | 55/274 X |
| 1,537,519 | 5/1925 | Yablick | 422/119 |
| 2,034,373 | 3/1936 | Bilde | 55/274 X |
| 2,554,879 | 5/1951 | Race, Jr. | 55/275 |
| 2,575,234 | 11/1951 | Race, Jr. | 55/275 |
| 2,621,753 | 12/1952 | Urdahl | 55/275 |
| 3,171,726 | 3/1965 | Roney et al. | 55/275 |
| 3,705,480 | 12/1972 | Wireman | 55/275 |
| 3,841,484 | 10/1974 | Domnick | 55/274 X |
| 3,902,485 | 9/1975 | Wallace | 55/274 X |
| 3,966,440 | 6/1976 | Roberts | 55/274 |
| 4,088,461 | 5/1978 | Brauer | 55/275 |
| 4,154,586 | 5/1979 | Jones et al. | 55/274 |
| 4,155,358 | 5/1979 | McAllister et al. | 55/274 X |
| 4,272,480 | 6/1981 | Stull et al. | 55/274 X |
| 4,278,453 | 7/1981 | Klein | 55/275 |
| 4,530,706 | 7/1985 | Jones | 55/275 |
| 4,572,725 | 2/1986 | Kojima | 55/274 |

FOREIGN PATENT DOCUMENTS

| | | | |
|---|---|---|---|
| 644230 | 7/1962 | Canada | 55/275 |
| 46214 | 4/1936 | France | 55/274 |

*Primary Examiner*—Robert Spitzer

*Attorney, Agent, or Firm*—McGlew and Tuttle

[57] ABSTRACT

Gas filters protect the user of respirator equipment against the inspiration of harmful gases. The protection decreases with the use of the filter. To alert the user in time to the imminent exhaustion of the filter material, the respirator is equipped with an indicator that makes the remaining time of use visible through optical characteristics such as color change. The indicator provides for the inclusion of an indicator granulate loosely filled between two discs and permeable to the respiration gas, which changes its color as it detects a gas to be filtered out. The indicator is located in a container open to the gas flow which is covered by an inlet screen and it extends to a given immersion depth into the filter material. The immersion depth guarantees that the respiration gas flows uniformly through the indicator with each inspiration.

5 Claims, 2 Drawing Figures

COLORIMETRIC INDICATOR FOR THE INDICATION OF THE EXHAUSTION OF GAS FILTERS

FIELD AND BACKGROUND OF THE INVENTION

This invention relates in general to indicating devices and in particular to a new and useful indicating device for respiration filters.

The invention concerns a device for the indication of the exhaustion of gas filters by a color indicator which contains the substance indicating the exhaustion of the filter material in a container that is located inside the filter housing and can be seen through a window from the outside.

The gas filters in respiration equipment, such as masks or at other respirator connections, protect the user against the inhaling of toxic gases. The protection eventually decreases with use. Respirator filters are equipped with indicators that make the remaining time of use visible by optical signs to warn the carrier in time of the imminent exhaustion of the filter material.

A similar device for the indication of the exhaustion of gas filters is known for German DE-PS 694 423. A protective respirator filter with several removable single filters located one behind the other and, which contain also a substance indicating the exhaustion of the filter material, is disclosed therein. The substance is placed behind a window located in the wall of the filter housing. In the practical example the window is screwed into a socket attached to the filter housing. The window may be shaped to form also the receptacle for the indicator. The indicator, however, signals the exhaustion of the filter materials only when the poisonous substance to be kept out has already completely permeated the filter material, which means that the user is not given an early warning, i.e. before the complete exhaustion of the filter material and before the penetration of the poisonous substance.

A respirator filter is known from German DE-PS 703 932 in which the filter material is divided into two layers with a piece of pipe inserted into the filter material from the side where the air escapes. As the harmful poisonous substance penetrates the first layer of the filter material, which extends from the filter entrance uptake to the beginning of the pipe, the user of the equipment will inhale partially unfiltered respiration gas through the piece of pipe, and the user is supposed to notice through his olfactory sense that the filter material is almost completely permeated by the harmful substance to be held back. But such an indication of the exhaustion addresses only the olfactory sense of the user of the equipment, and it is impossible to notice odorless harmful substances with this device in time.

Another colorimetric indicator is already known from German DE-PS 26 23 065 (U.S. Pat. No. 3,966,440). The filter comprises a chamber containing the active filter material with an indicator window adjacent to an opening allowing a view of the chamber interior. The colorimetric indicator material is placed immediately behind the indicator window. It extends partly into the active filter material.

The indicator material, aluminum oxide impregnated with potassium permanganate in this case, changes its red color to brown under the influence of the vinyl compounds to be retained in the filter. This color change occurs with the weakening of the retaining power and takes place in the direction of the filter outlet. A prompt warning is given with the extension of the indicator into the filter material.

Since the indicator material is arranged in the outer periphery of the container holding the filter material, a penetration of the harmful substance can occur even when the indicator material has not yet reached a complete color change, due to differences in the flow rates of the respiration gases within the filter material.

SUMMARY OF THE INVENTION

The present invention provides an improved device for the indication of the exhaustion of gas filters in such a way that it indicates the approaching exhaustion of the filter material by means of a constant, controlled flow of the respiration gas through it. A selection of the indicator shall be made independently of the filter material used and exclusively along guidelines for a color reaction suitable for the harmful substance to be detected.

In accordance with the invention a container that has a layer of granules with the color indicator located between two discs through which the respiration gas flows and which includes an extension is seated inlet screen, to the immersion depth into the filter material. The arrangement of the container according to the invention in the filling of the filter material guarantees that the flow resistance through the indicator layer corresponds to the resistance of the filter filling that would take up the identical geometric space. Due to this arrangement a specific partial volume of the respiration gas is led through the indicator layer with each inspiration. When harmful substance to be retained in the filter material reaches the container, an immediate permeation of the indicator layer by the harmful substance is achieved before the remaining filter material is saturated with the harmful substance.

In particular, the approaching exhaustion of the filter material can be recognized at different, early times when several indicators are placed with their containers at different immersion depths in the filter material. Thus a chronological progression of the loading of the filter material with harmful substances can be observed by the equipment user, which is especially advantageous when the atmosphere of the environment is charged with large quantities of harmful substances. For a closer control the indicator layer is best examined through a magnifying lens.

When several harmful substances, which can penetrate through the filter material, are to be indicated, several indicators each with an indicator layer specific for the harmful substance to be detected are provided to advantage.

The indicators for the indication of exhaustion described so far allow only one color reaction with one or a few harmful substances and thus cannot cover the area of application of multipurpose filters. In a suitable practical example of the invention, the container can be equipped with an additional pre-layer, by which, for example, a large number of organic compounds, which as such would only cause an almost imperceptible color change, are converted into such substances that cause a clearly distinguishable color reaction in the color indicator.

In an especially favorably conceived form, the container with the indicator can be constructed as a unit that can be inserted into a prepared receptacle of the filter filling.

Since the respiration air flows through the indicator container, an additional weather vane may be located in the field of vision of the window.

Accordingly it is an object of the invention to provide an improved indicator for use with respirators which includes a housing for the indicator which is positioned within the filter material through which the respirating gases pass and which includes a material for indicating remaining life of the filter material.

A further object of the invention is to provide a respirator filter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
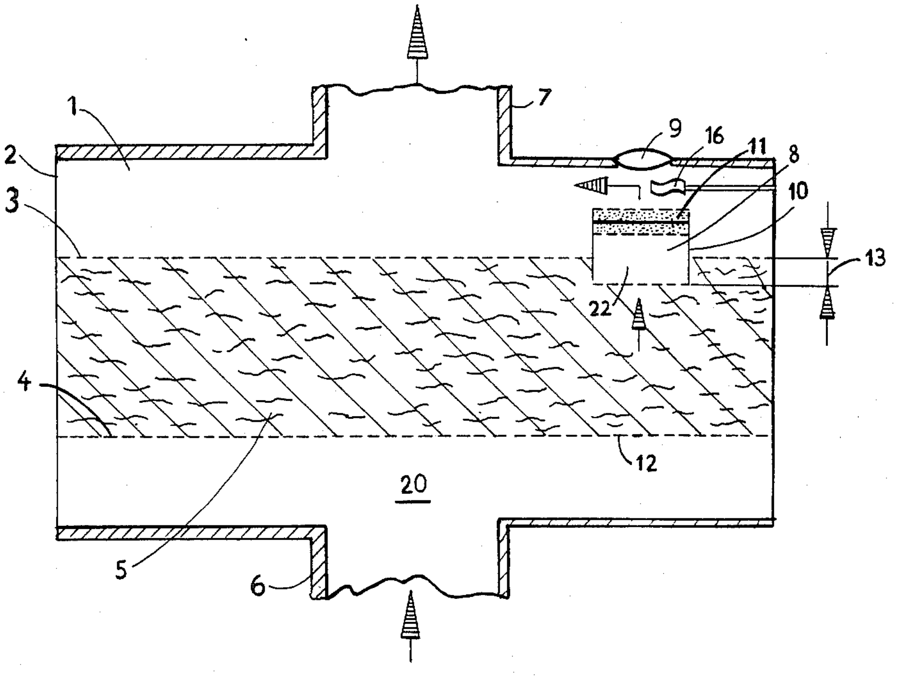
FIG. 1 is a schematic sectional view of a respirator with the colorimetric indicator constructed in accordance with the invention.

Referring to the drawings in particular the invention embodied therein comprises a respirator filter construction which includes a filter housing 2 having a respirator gas inlet 6 and a respirator gas outlet 7 with a first respirator gas flow passage 20 which is between the inlet and the outlet.

In accordance with the invention a filter material 5 extends across the respirator gas flow passage 20 and a colorimetric indicator has an indicator housing or container 10 with a perforated wall at each end and with closed side walls so as to define a second respirator air flow passage 22 through the container 10. In the embodiment shown a pair of spaced apart perforated discs 15 and 15' which are advantageously transparent are arranged in spaced location toward the discharge end of the container and one of the walls of the disc may form the end wall of the container which has two perforated walls one at each end.

In accordance with a feature of the invention at least one granular layer 11 is positioned between the disc and in the embodiment shown two separate layers 11 and 11' are provided. The layers 11 and 11' etc. form separate layers of separate color indicator materials arranged between the discs 15 and 15'.

In accordance with a particular arrangement and feature of the invention the container 10 is positioned within the filter material so that it extends inwardly of a discharged end screen or outlet perforated wall 3 and spaced above the inlet perforated wall 12. Filter material 11, 11' etc. is positioned in the container 10 so that the second gas flow passage 22 through the container 10 is oriented to receive flow from the first respiratory gas passage 20 before the respiratory gas passes completely through the filter material. Wall 3 defines an outlet chamber and wall 12 defines and inlet chamber in said housing 2. Container 10 is also spaced inwardly of the housing.

The respirator 1 contains in a filter housing 2 the filter material 5 held between an upper screen 3 and a lower screen 4. The gas to be cleaned, in most cases the air in the environment, flows through intake opening 6, filter material 5 and then leaves again after having been cleaned, through outlet opening 7.

The colorimetric indicator 8 is located in upper screen 3, opposite a window 9 constructed as magnifying glass. It contains a granulate layer 11 with the color indicator in a container 10 open to the gas flow. Container 10, which is covered with an inlet screen 12, extends with an immersion depth 13 into filter material 5. Granular layer 11 is kept at the other container end 14, loosely filled between screens 15. The flow through indicator 8 is shown by a flow indicator or weather vane 16, located in the field of vision of window 9.

Figure 2:
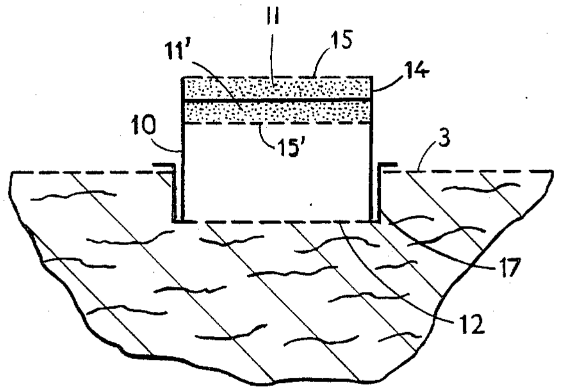
FIG. 2 is an indicator in a receptacle.

In FIG. 2 the indicator unit comprises a unified container 10 with screens 15 and granulate layer 11 which is inserted in a receptacle 17. Receptacle 17 also has an inlet screen 12.

While specific embodiments of the invention have been shown and described in detail to illustrate the application of the principles of the invention, it will be understood that the invention may be embodied otherwise without departing from such principles.

What is claimed is:

1. A respirator filter construction, comprising a filter housing having a respirator gas inlet and a respirator gas outlet at respective ends, said housing defining a first respirator gas flow passage between said inlet and said outlet, an outlet perforated wall extending across said first gas flow passage and defining an outlet chamber with said housing which communicates with said outlet, an inlet perforated wall extending across said first gas flow passage and defining an inlet chamber with said housing which communicates with said inlet, a filter material in said first gas flow passage between said inlet and outlet perforated walls, a colorimetric indicator comprising an indicator container having an interior space defining a second respirator gas flow passage, said container having an inlet end with a first perforated disc thereacross and an outlet end with a second perforated disc thereacross, said inlet end with said first perforated disc being immersed by a selected depth into said filter material and into said outlet perforated wall at locations spaced inwardly of said housing in said outlet chamber, a third perforated disc extending across said second gas flow passage and being spaced inwardly of said second perforated disc with respect to said interior space of said container, at least one granular layer of color indicator between said spaced second and third perforated discs, said granular layer being permeable to respirator gases, said second and third perforated discs with said granular layer therebetween being spaced away from said filter material to leave a portion of said interior space free between said first perforated disc and said second perforated disc whereby respirator gases passing through said first perforated disc pass into said second gas flow passage for exposure to said granular layer before respirator gases pass through said outlet perforated wall, and a window in said housing aligned with said container for viewing said container.

2. A respirator filter according to claim 1, wherein said window comprising a magnifying glass arranged in alignment with said indicator container.

3. A respirator filter according to claim 1, wherein said indicator container has at least one layer for the conversion of a harmful substance into a substance recognizable by said color indicator and at least one other layer located downstream of this layer which indicates the substance.

4. A respirator filter according to claim 1, wherein said indicator container comprises a separate element said filter housing having a receptical of a size to receive said element in the filter material.

5. A respirator filter according to claim 1, including a member mounted over said indicator housing indicating flow therethrough.

* * * * *